United States Patent
Southwell

(10) Patent No.: US 9,533,381 B2
(45) Date of Patent: Jan. 3, 2017

(54) ALIGNING FIXTURE FOR BOX WELDING

(71) Applicant: Steven Arthur Southwell, Bloomingdale, IL (US)

(72) Inventor: Steven Arthur Southwell, Bloomingdale, IL (US)

(73) Assignee: Nu-Way Industries, Inc., Des Plaines, IL (US)

( * ) Notice: Subject to any disclaimer, the term of this patent is extended or adjusted under 35 U.S.C. 154(b) by 192 days.

(21) Appl. No.: 14/494,308

(22) Filed: Sep. 23, 2014

(65) Prior Publication Data

US 2015/0084254 A1    Mar. 26, 2015

Related U.S. Application Data

(60) Provisional application No. 61/882,506, filed on Sep. 25, 2013.

(51) Int. Cl.
*B25B 1/00* (2006.01)
*B23K 37/04* (2006.01)
*B25H 1/02* (2006.01)

(52) U.S. Cl.
CPC ............. *B23K 37/0452* (2013.01); *B25H 1/02* (2013.01)

(58) Field of Classification Search
USPC ......................................................... 269/17
See application file for complete search history.

(56) References Cited

U.S. PATENT DOCUMENTS

| | | | | |
|---|---|---|---|---|
| 3,598,390 A | * | 8/1971 | Armitage | B25H 1/00 118/503 |
| 3,689,057 A | * | 9/1972 | Webster | B25H 1/0007 269/17 |
| 4,519,476 A | * | 5/1985 | Alimbau Marques | E06C 1/393 182/151 |
| 5,937,924 A | * | 8/1999 | Cooper | B25H 1/005 108/143 |
| 6,095,319 A | * | 8/2000 | Noniewicz | B23D 47/025 198/632 |
| 6,565,165 B2 | * | 5/2003 | Switkes | B60P 3/14 144/285 |
| 7,377,525 B1 | * | 5/2008 | Whitmore | B25H 1/04 280/39 |
| 2009/0078165 A1 | * | 3/2009 | Tseng | A47B 3/0912 108/6 |
| 2010/0018442 A1 | * | 1/2010 | Knudsen | B25H 1/04 108/176 |

FOREIGN PATENT DOCUMENTS

CN    202943204 U * 5/2013

* cited by examiner

*Primary Examiner* — Alvin Grant

(57) ABSTRACT

An aligning fixture for box welding that is used to internally support a work-piece has a mounting plate and a plurality of supporting legs. Each of the plurality of supporting legs is removably attached to the mounting plate by a plate connector in order to provide adjustability for welding work-pieces of various sizes. A support structure, being a first leg and a second leg, is pivotally connected to the plate connector and a hinge. The hinge supports a roller mount, a roller, and a pad assembly. The roller mount is vertically positioned, wherein the roller is connected to the roller mount opposite the hinge. The roller allows the supporting leg to slide across the bottom surface within the work-piece. The pad assembly is pivotally attached to the hinge and rests flush against the inner wall of the work-piece when the aligning fixture is deployed.

19 Claims, 11 Drawing Sheets

ALIGNING FIXTURE FOR BOX WELDING

The current application claims a priority to the U.S. Provisional Patent application Ser. No. 61/882,506 filed on Sep. 25, 2013.

FIELD OF THE INVENTION

The present invention relates generally to a backup welding fixture. More specifically, the present invention is an aligning fixture for box welding that is used to securely hold a work-piece during welding. Furthermore, the present invention can be used in both manual and robotic applications.

BACKGROUND OF THE INVENTION

The general process of welding consists of joining metals by way of applying heat, with the use of pressure or with the use of intermediate or filler metals having a high melting point. Welding is a very meticulous method due to the materials that the welding process undergoes. Safety and effectiveness are very important factors to consider while welding units. During the welding process, users must be ensured that their resources are secure, yet also have the ability to be multi-faceted.

The present invention can substantially improve the welding process. The present invention is an aligning fixture that is used to securely hold a work-piece during welding. The present invention is versatile in that it can be used in either manual or robotic applications. The present invention comprises a mounting plate with four removable supporting legs that provide for quick adjustments for various sized work-pieces through the use of multiple locator mounting holes. The present invention differentiates from existing inventions because the present invention can quickly be secured in place, and just as quickly, be released. This feature allows the present invention to be in used in production manufacturing where speed during set-up is required. Once the adjustments to the fixture have been determined, use on the next part is not only fast, but very precise which helps to ensure the squareness of the design.

DETAIL DESCRIPTIONS OF THE INVENTION

All illustrations of the drawings are for the purpose of describing selected versions of the present invention and are not intended to limit the scope of the present invention.

The present invention is an alignment fixture for box welding that is used to securely support a work-piece during welding. The present invention comprises a mounting plate 10 and a plurality of supporting legs 12. Each of the plurality of supporting legs 12 is attached to the mounting plate 10, wherein each of the plurality of supporting legs 12 can be pivoted. The application of pressure to the side of the mounting plate 10 opposite the plurality of supporting legs 12 forces the plurality of supporting legs 12 to radially expand about the perimeter of the mounting plate 10, while simultaneously collapsing the plurality of supporting legs 12 towards the mounting plate 10.

In reference to FIG. 1-4, the mounting plate 10 is a flat piece of material to which each of the plurality of supporting legs 12 is attached. The mounting plate 10 comprises a plurality of locator mounting holes through which each of the plurality of supporting legs 12 is attached to the mounting plate 10. In the preferred embodiment of the present invention, nuts and bolts are used to secure the plurality of supporting legs 12 to the mounting plate 10, wherein a single bolt traverses through each of the plurality of supporting legs 12 and through the mounting plate 10. However, it is possible for the plurality of supporting legs 12 to be attached to the mounting plate 10 in any other way.

The mobility of the plurality of supporting legs 12 about the mounting plate 10 allows the present invention to be adapted for use with work-pieces of many various sizes. For larger work-pieces the plurality of supporting legs 12 can be positioned closer to the outer edge of the mounting plate 10. Conversely, for smaller work-pieces the plurality of supporting legs 12 can be positioned closer to the center of the mounting plate 10. The positioning of the plurality of supporting legs 12 can also be adjusted in order to accommodate work-pieces of various shapes such as squares, rectangles, etc.

The mounting plate 10 may further comprise a robotics mount 11, wherein the mounting plate 10 can be attached to a robotic arm or similar device, such as those found in a manufacturing line. The robotics mount 11 is positioned on the mounting plate 10 opposite the plurality of supporting legs 12, such that the robotic arm can apply pressure to the mounting plate 10 in order to deploy the plurality of supporting legs 12. Once the positioning of each of the plurality of supporting legs 12 has been properly configured, the robotic arm can be used to quickly and efficiently transfer the present invention from one work-piece to another.

Figure 1:
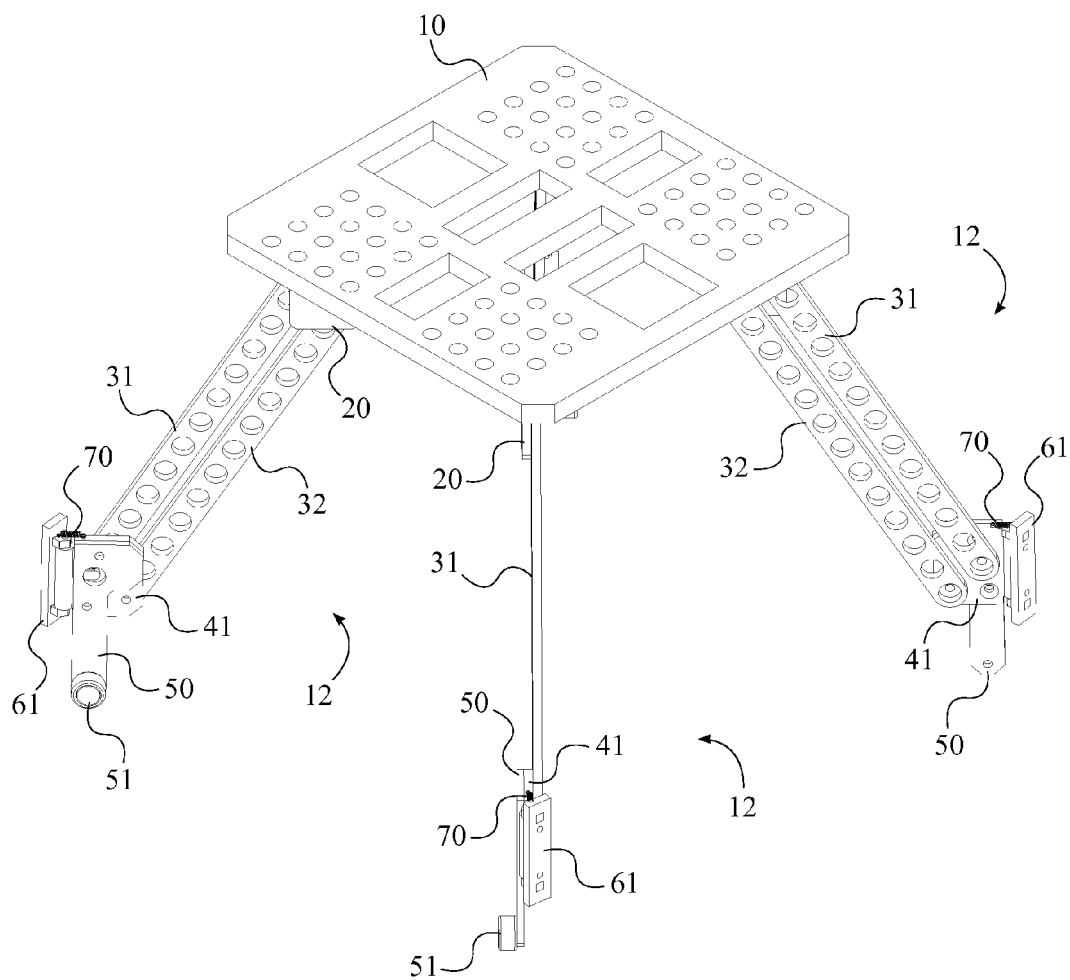
FIG. 1 is a perspective view of the present invention.
Figure 2:
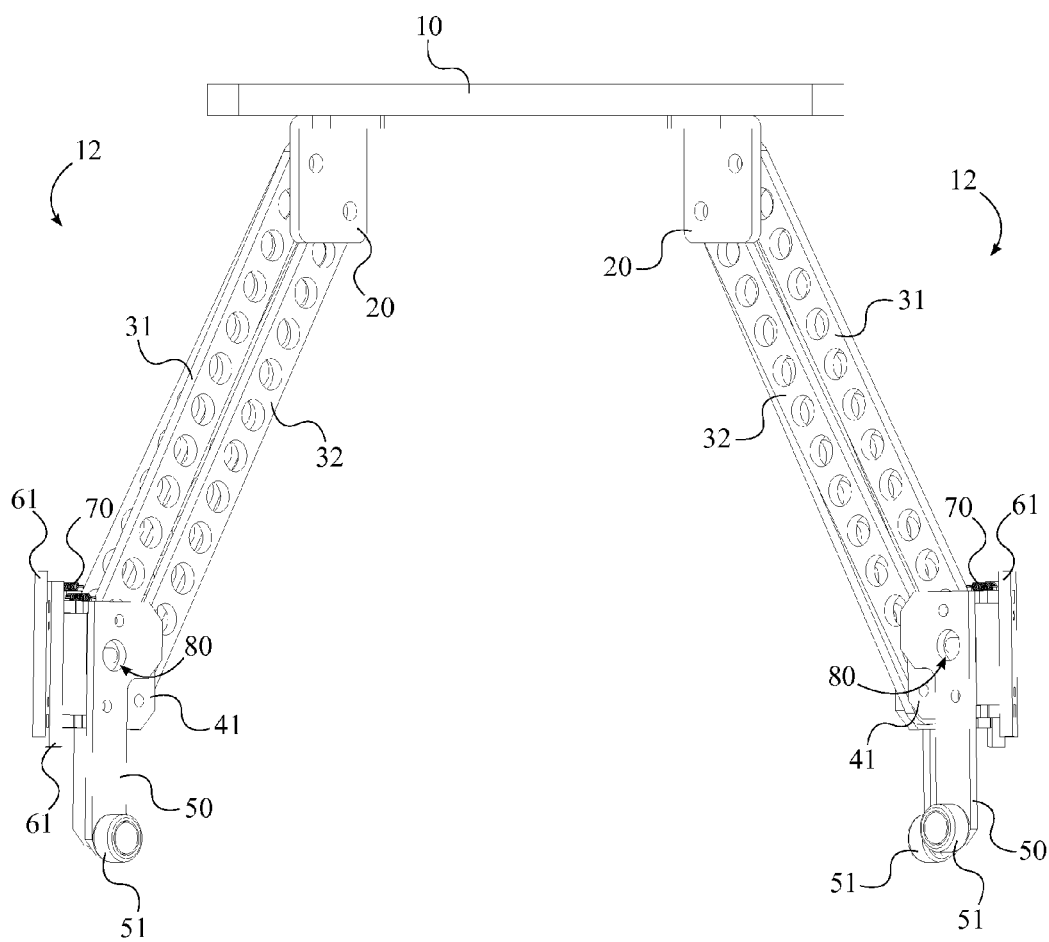
FIG. 2 is a front elevational view of the present invention.
Figure 3:
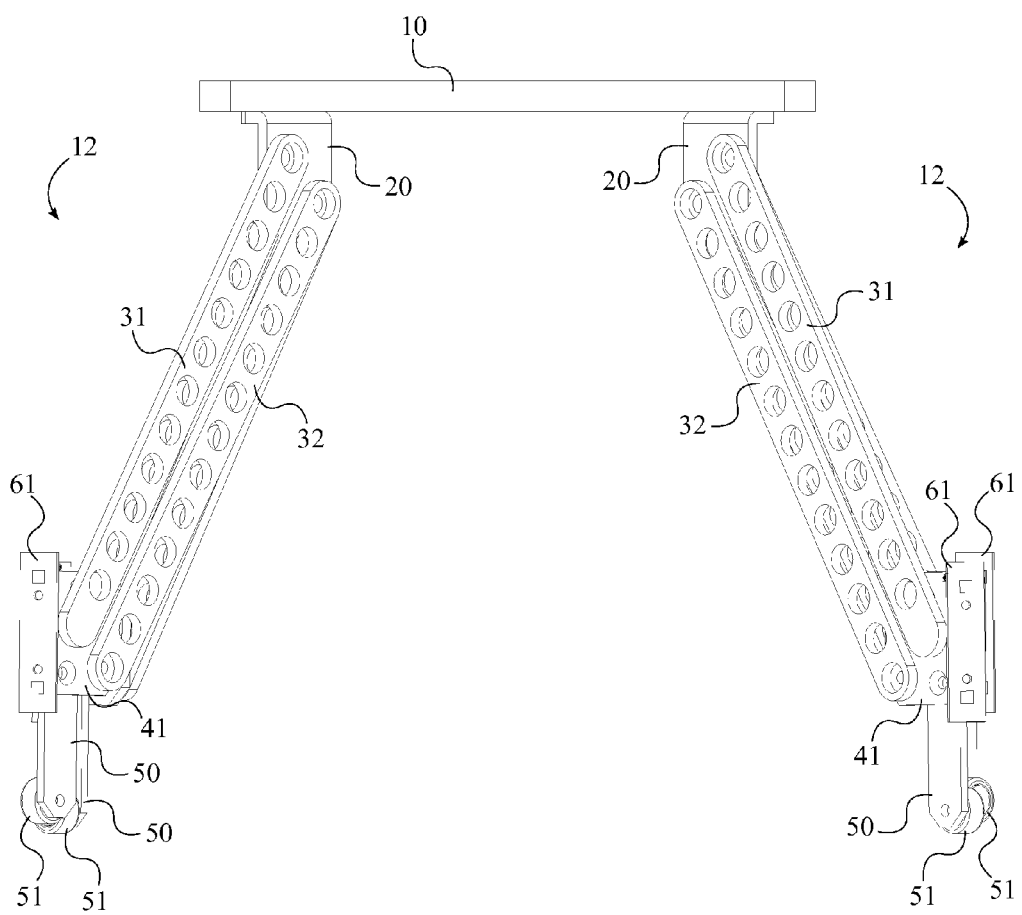
FIG. 3 is right side elevational view of the present invention.
Figure 4:
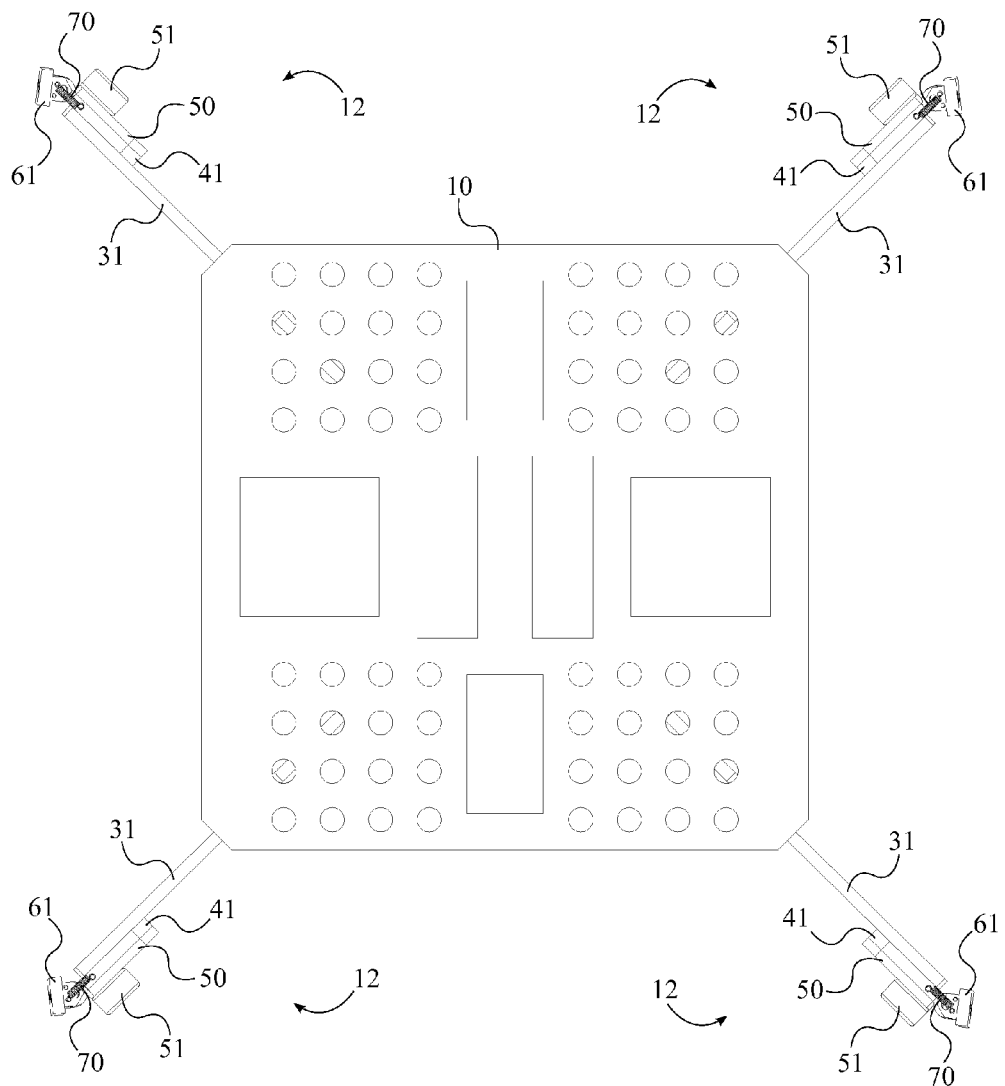
FIG. 4 is a top plan view of the present invention.
Figure 5:
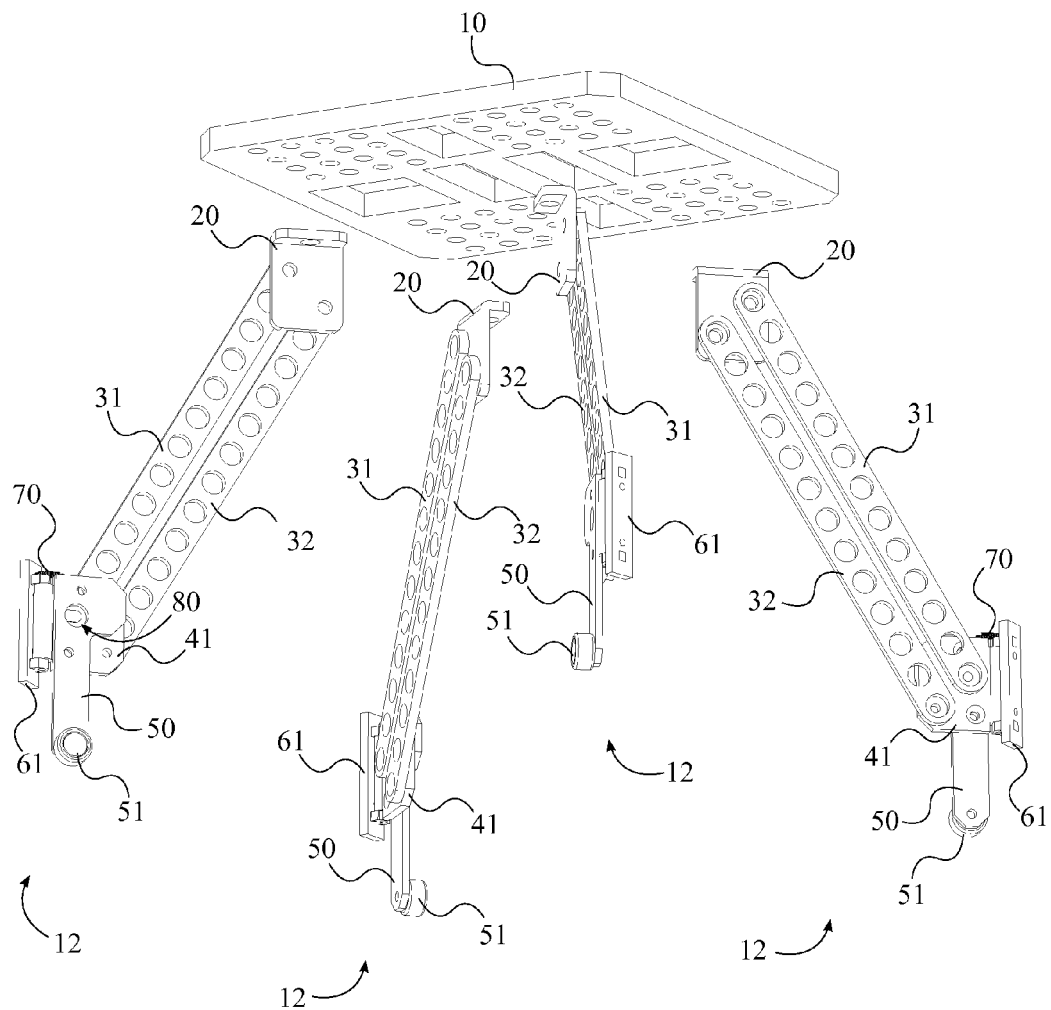
FIG. 5 is a bottom perspective view of the present invention, wherein each of the plurality of supporting legs is detached from the mounting plate.
Figure 6:
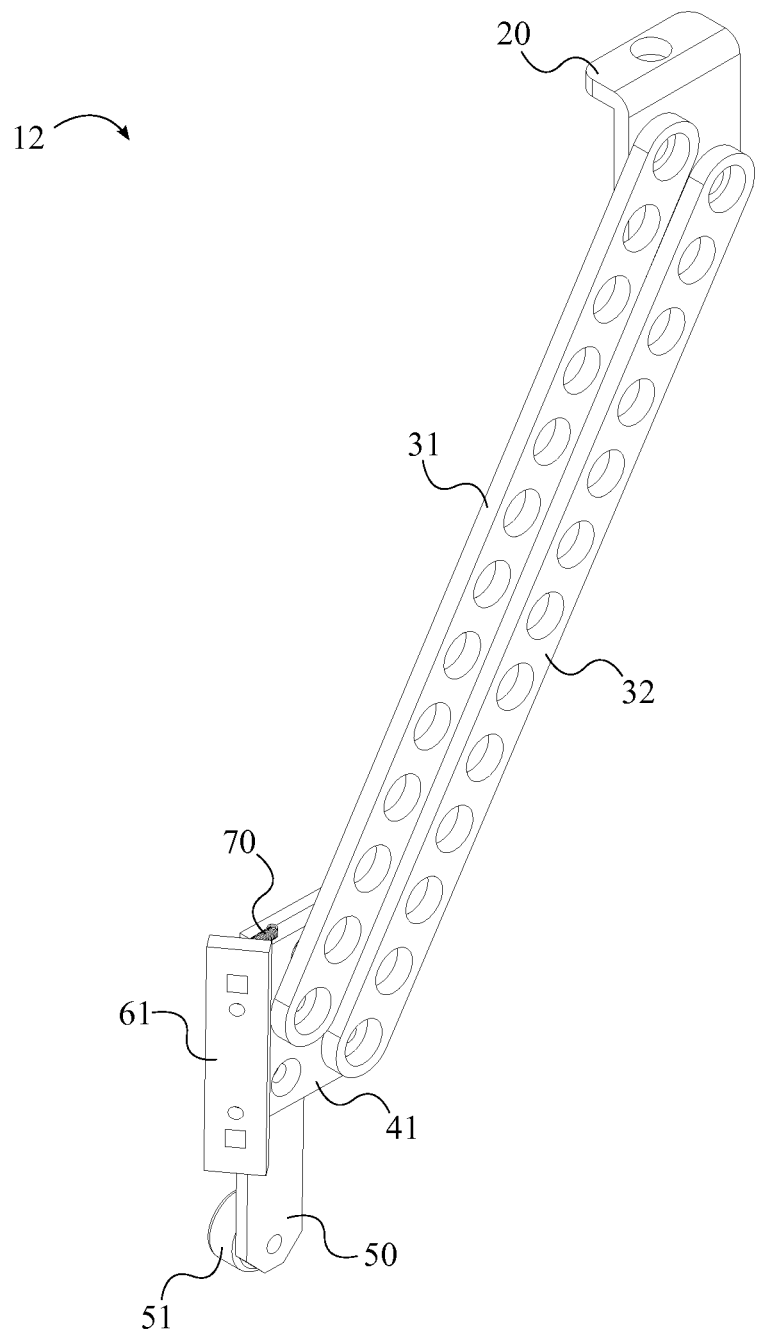
FIG. 6 is a perspective view of one of the plurality of supporting legs.
Figure 7:
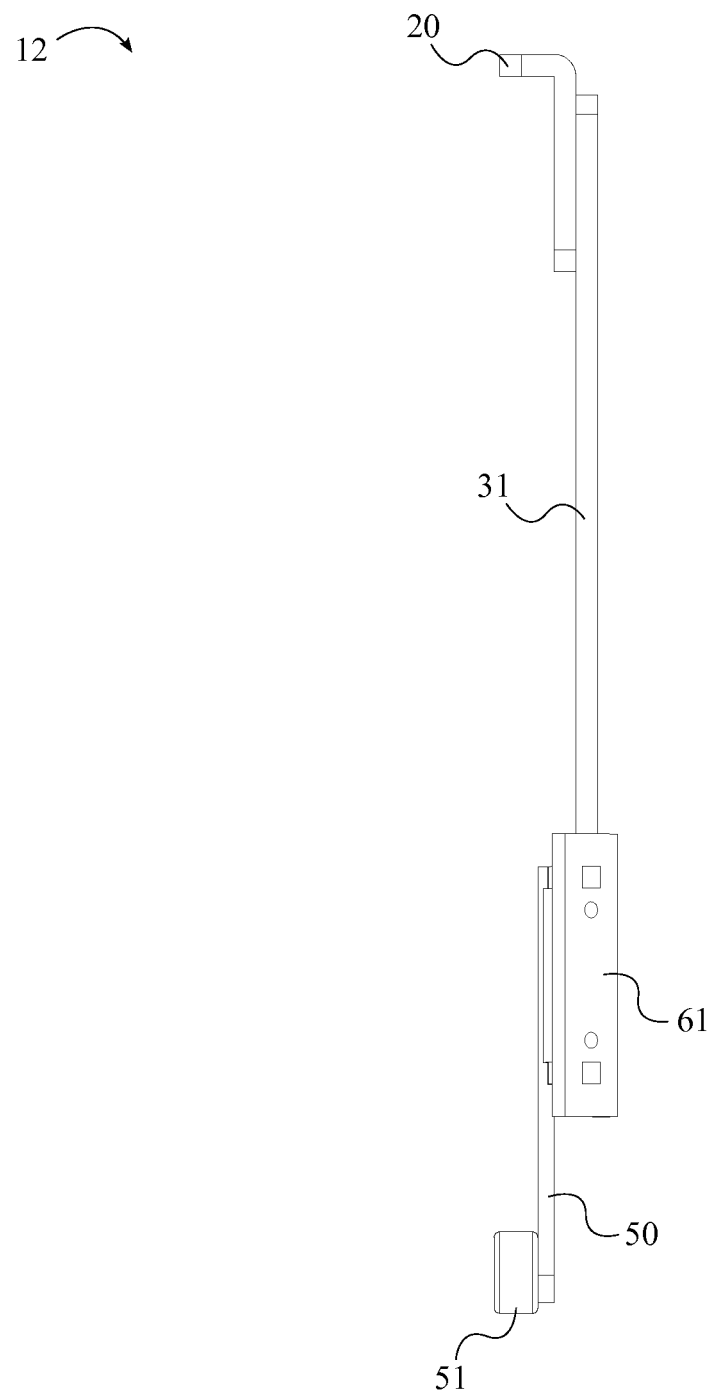
FIG. 7 is a front elevational view of one of the plurality of supporting legs.
Figure 11:
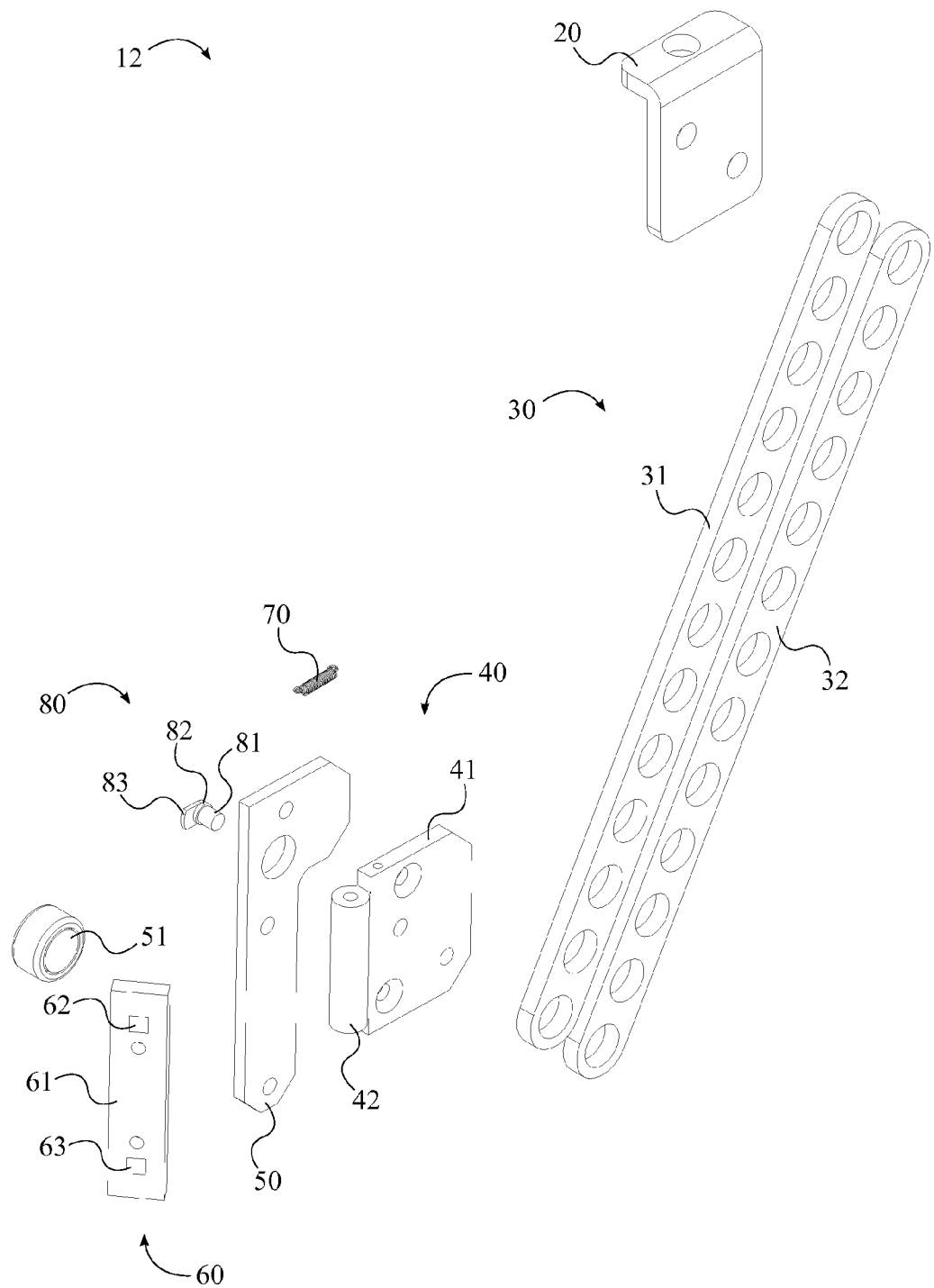
FIG. 11 is an exploded view of one of the plurality of supporting legs.

In reference to FIG. 6 and FIG. 11, each of the plurality of supporting legs 12 comprises a support structure 30, a plate connector 20, a hinge 40, a roller mount 50, a roller 51, a pad assembly 60, a tension spring 70, and a cam acting lock mechanism 80. The plate connector 20 for each of the plurality of supporting legs 12 provides the means by which the plurality of supporting legs 12 is attached to the mounting plate 10. As such, the plate connector 20 is adjacently attached to the mounting plate 10, while the support structure 30 is pivotally connected to the plate connector 20 opposite the mounting plate 10. In the preferred embodiment of the present invention, the plate connector 20 is an L-shaped brace, wherein a single bolt traverses through the plate connector 20 and through the mounting plate 10 in order to attach the plate connector 20 to the mounting plate 10.

Figure 8:
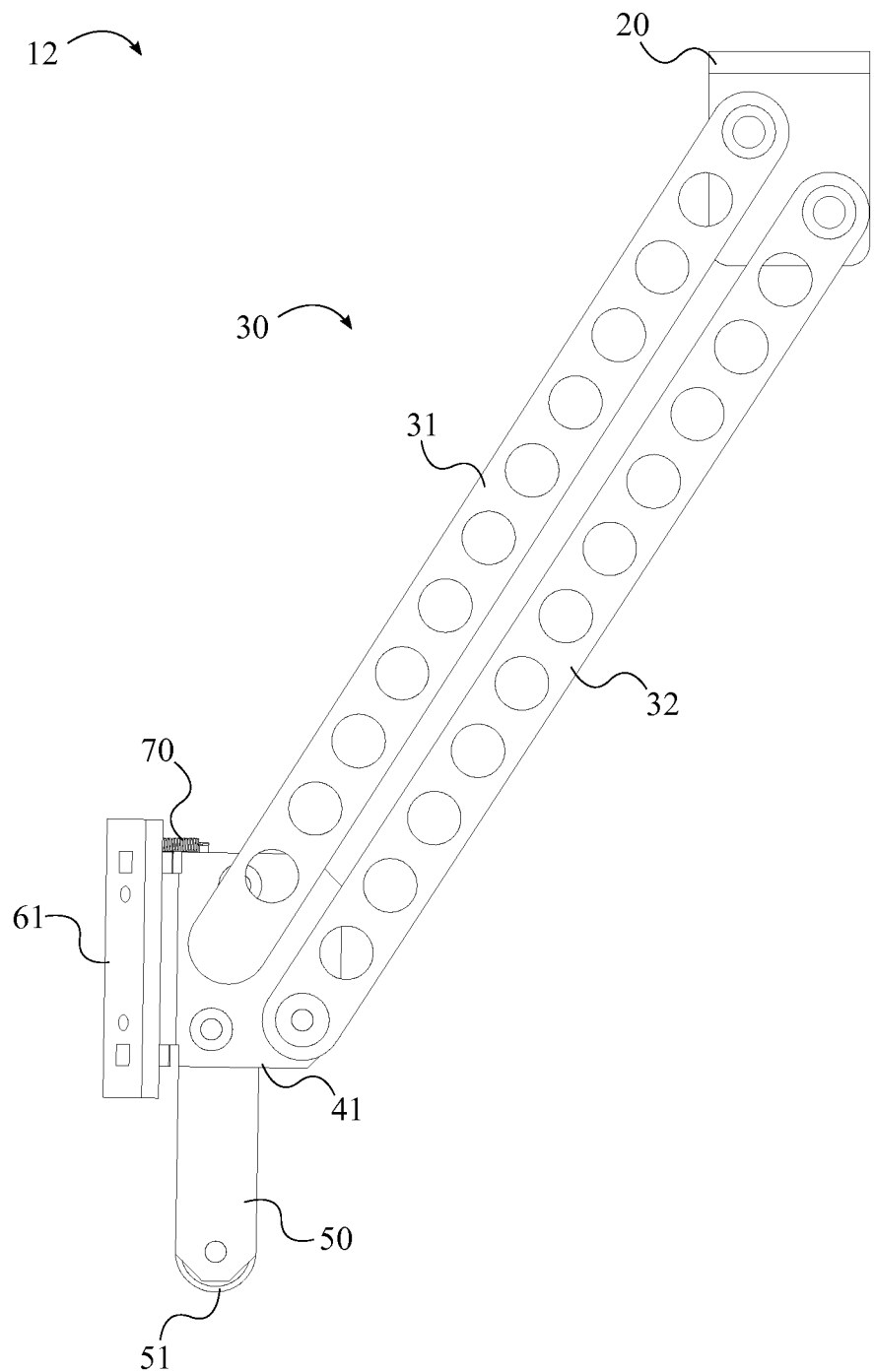
FIG. 8 is a right side elevational view of one of the plurality of supporting legs.
Figure 9:
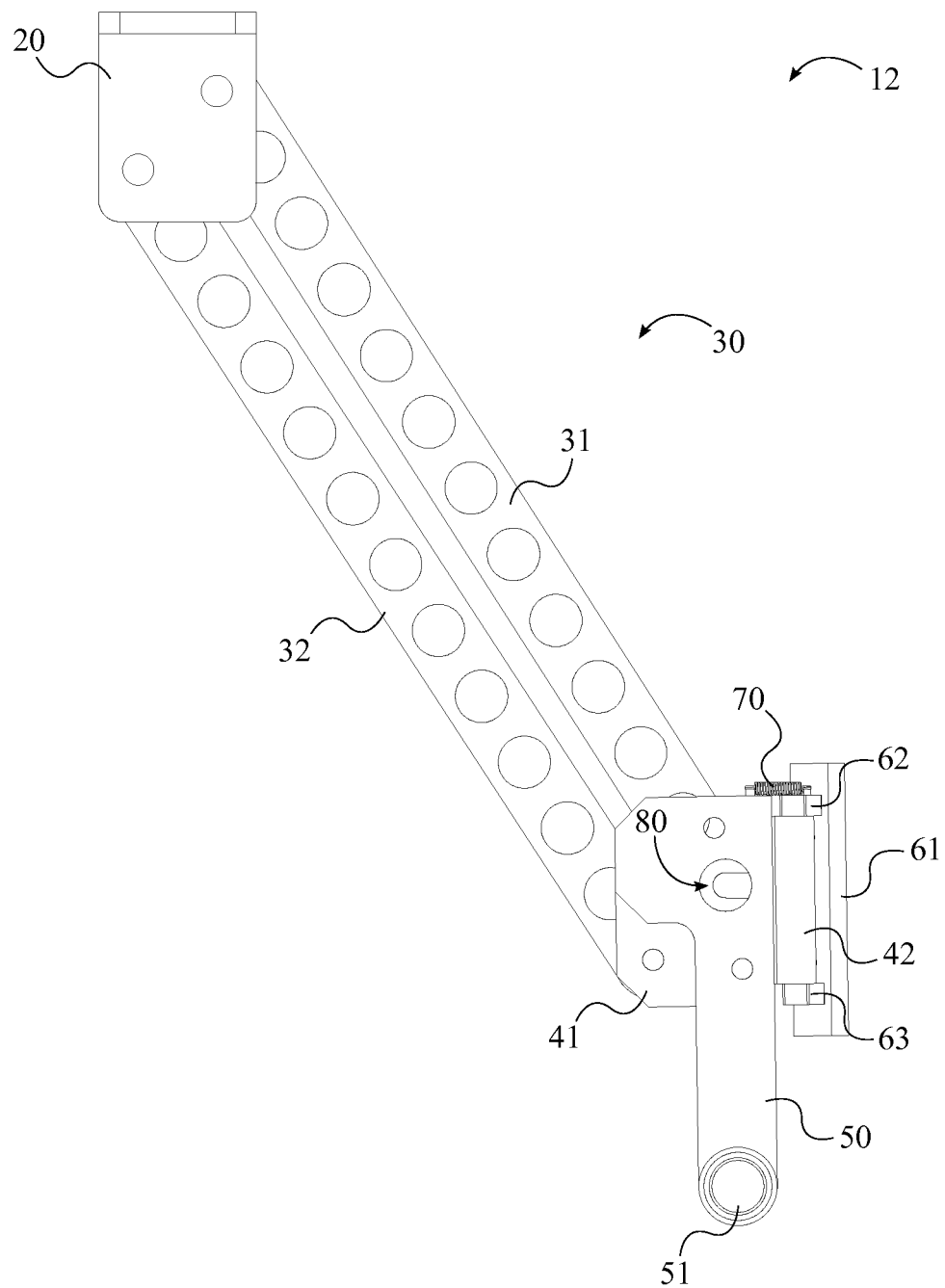
FIG. 9 is a left side elevational view of one of the plurality of supporting legs.

In reference to FIG. 8-9, the hinge 40 is positioned opposite the plate connector 20 along the support structure 30, wherein the support structure 30 is pivotally connected to the hinge 40. The hinge 40 supports both the roller mount 50 and the pad assembly 60, wherein the roller mount 50 is fixed in place, while the pad assembly 60 is pivotally connected to the hinge 40. The roller mount 50 is adjacently connected to the hinge 40 opposite the support structure 30, wherein the hinge 40 is positioned in between the support structure 30 and the roller mount 50. The roller mount 50 is a vertically positioned member and extends away from the hinge 40 in the direction opposite the mounting plate 10 and the roller 51 is pivotally connected to the roller mount 50 opposite the hinge 40. In this way, the roller 51 is positioned opposite the mounting plate 10 about the present invention, wherein the roller 51 comes in contact with the ground. In the preferred embodiment of the present invention, the roller 51 is a ball bearing, however, it is possible for any other similar type of mechanism to be used.

In reference to FIG. 6 and FIG. 11, the hinge 40 comprises a hinge plate 41 and a barrel 42, wherein the barrel 42 is adjacently connected to the hinge plate 41 and positioned along the hinge plate 41. The support structure 30 is pivotally connected to the hinge plate 41 and the roller mount 50 is adjacently connected to the hinge plate 41 opposite the support structure 30, wherein the hinge plate 41 is positioned in between the support structure 30 and the roller mount 50. The pad assembly 60 is pivotally connected to the barrel 42, wherein the pad assembly 60 may be pressed flush against the inner surface of a work-piece.

In reference to FIG. 8-9, the support structure 30 comprises a first leg 31 and a second leg 32, wherein the first leg 31 is positioned adjacent to the second leg 32. More specifically, the first leg 31 and the second leg 32 are positioned parallel to each other. Both the first leg 31 and the second leg 32 are pivotally connected to the plate connector 20, wherein pressure applied to the mounting plate 10 opposite the plurality of supporting legs 12 causes the first leg 31 and the second leg 32 to pivot about the plate connector 20. Additionally, the first leg 31 and the second leg 32 are pivotally connected to the hinge 40. In this way, the support structure 30 forms a parallel motion linkage, wherein the support structure 30 is able to collapse towards the mounting plate 10 and the roller mount 50 remains aligned in the same vertical position as the hinge 40 is directed away from the outer edge of the mounting plate 10.

As the support structure 30 expands outwards from the mounting plate 10, the pad assembly 60 comes in contact with a wall of the work-piece. The pad assembly 60 being pivotally attached to the hinge 40 allows the pad assembly 60 to rest flush against the wall no matter what angle the support structure 30 is relative to the wall. More specifically, the pad assembly 60 is pivotally connected to the barrel 42 of the hinge 40. The pad assembly 60 provides a flat panel for positioning against the wall of the work-piece and comprises a plate 61, a first flange 62, and a second flange 63. The plate 61 is adjacently attached to first flange 62 and the second flange 63 the first flange 62 and the second flange 63 being positioned opposite each other along the plate 61. The first flange 62 and the second flange 63 extend from the surface of the plate 61 opposite the wall of the work-piece and are both pivotally attached to the hinge 40. More specifically, the first flange 62 and the second flange 63 are pivotally attached to the barrel 42 of the hinge 40.

The plate 61 can be removed from the first flange 62 and the second flange 63, such that the plate 61 can be replaced with a differently sized or shaped plate to accommodate for various work-pieces. In the preferred embodiment of the present invention, the plate 61 is constructed from copper, however, it is possible for any other suitable material to be used to construct the plate 61. The plate 61 can also be modified in order to provide liquid cooling or inert gas purging for the weld area.

Figure 10:
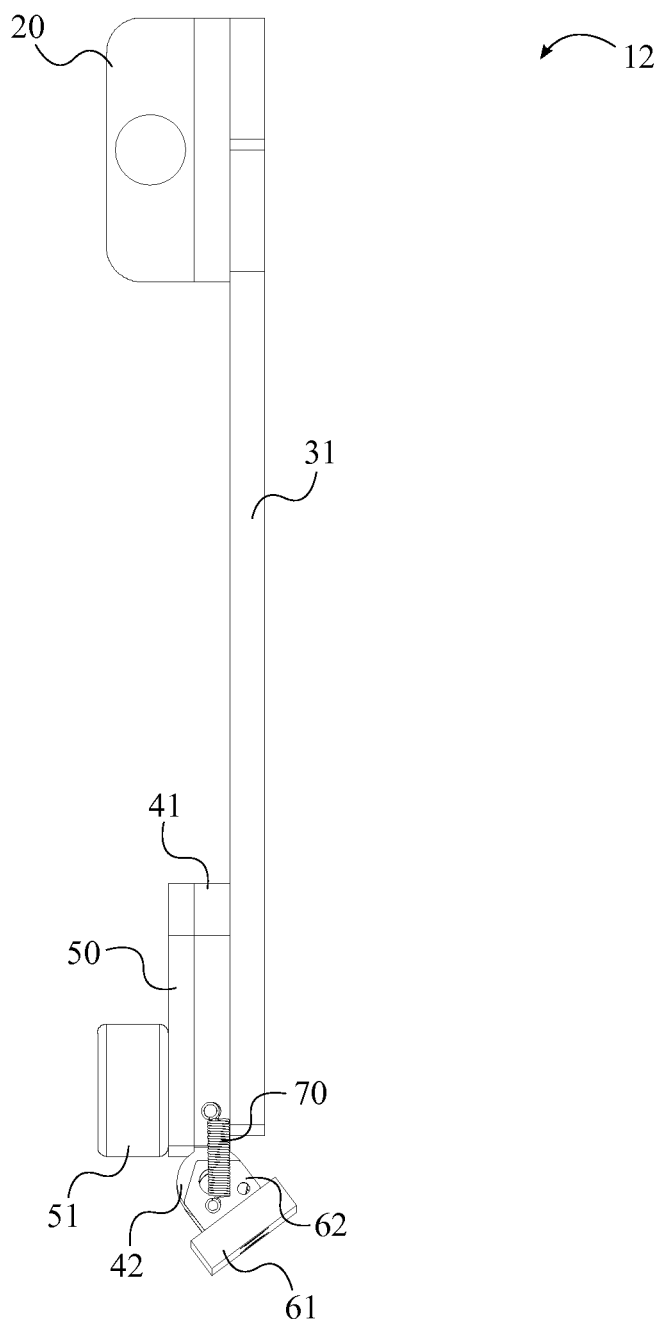
FIG. 10 is a top plan view of one of the plurality of supporting legs.

In reference to FIG. 10, the tension spring 70 is adjacently connected to the pad assembly 60 and the hinge 40. More specifically, the tension spring 70 is adjacently connected to the first flange 62 and adjacently connected to the hinge plate 41. The tension spring 70 provides a force to press the pad assembly 60 flush against the wall of the work-piece. In this way, the tension spring 70 ensures that the pad assembly 60 remains in the same flush position throughout the entire welding process for which the present invention is used in order to ensure the wall of the work-piece is properly supported. The tension spring 70 also prevents the pad assembly 60 from freely pivoting about the hinge 40, such that the pad assembly 60 remains in the proper position when the present invention is removed from one work-piece and inserted into another work-piece to ensure that the pad assembly 60 rests flush against the wall of each work-piece.

In reference to FIG. 9, the cam acting lock mechanism 80 is adjacently connected to the support structure 30 (i.e. either the first leg 31 or the second leg 32) and is positioned adjacent to the roller mount 50. The cam acting lock mechanism 80 is connected to the support structure 30 such that as the support structure 30 pivots about the hinge 40, the cam acting lock mechanism 80 rotates as well. As the cam acting lock mechanism 80 rotates it engages a section of either the hinge 40 or the roller mount 50, wherein the support structure 30 is prohibited from rotating any further. This ensures that the support structure 30 is locked in place in order to provide the proper internal support required for the work-piece when using an external clamping system.

When downward pressure is applied to the top of the mounting plate 10, each of the plurality of supporting legs 12 expands outwards. As each of the plurality of supporting legs 12 expands outwards, the cam acting lock mechanism 80 for each of the plurality of supporting legs 12 is engaged, securely locking present invention in place to provide the proper internal support for the work-piece. The cam acting lock mechanism 80 allows for the quick placement and release of the present invention, wherein each of the plurality of supporting legs 12 is accurately and securely deployed. Thus, the present invention is ideal for use in production manufacturing where speed during set-up is required. Upon the completion of a weld for a work-piece, the cam acting lock mechanism 80 of each of the plurality of supporting legs 12 can quickly be disengaged by applying upwards pressure on the bottom of the mounting plate 10 or the plurality of supporting legs 12.

In reference to FIG. 11, in one embodiment of the present invention, the cam acting lock mechanism 80 comprises a shaft 81, a base 82, and a cam 83. The shaft 81 is adjacently connected to the support structure 30 (i.e. either the first leg 31 or the second leg 32) and allows for the rotational motion of the cam acting lock mechanism 80. The base 82 is adjacently attached to the shaft 81 opposite the support structure 30, while the cam 83 is adjacently connected to the base 82. The cam 83 is the component of the cam acting lock mechanism 80 that selectively engages either the portion of the hinge 40 or the roller mount 50 in order to prohibit the support structure 30 from rotating any further. The base 82 is removably attached to the shaft 81, such that the base 82 can be detached and reattached at a different angle in relation to the shaft 81 in order to adjust the degree of rotation of the support structure 30 about the hinge 40.

In the preferred embodiment of the present invention, the plurality of supporting legs 12 is specifically four supporting legs and the mounting plate 10 is square shaped. In this way, the present invention can be ideally configured to be used in box welding square and rectangular structures, wherein each of the four supporting legs is positioned against the inner surface of one wall of the work-piece. However, it is also possible for the plurality of supporting legs 12 to be any other number of legs in order to support different shaped work-pieces. Additionally, the mounting plate 10 may be configured in any shape as appropriate in order to be used with different shaped work-pieces.

Although the invention has been explained in relation to its preferred embodiment, it is to be understood that many other possible modifications and variations can be made without departing from the spirit and scope of the invention as hereinafter claimed.

What is claimed is:

1. An aligning fixture for box welding comprises:
a mounting plate;
a plurality of supporting legs;
each of the plurality of supporting legs comprises a support structure, a plate connector, a hinge, a roller mount, a roller, and a pad assembly;
the plate connector being adjacently attached to the mounting plate;
the support structure being pivotally connected to the plate connector opposite the mounting plate;
the support structure being pivotally connected to the hinge;
the hinge being positioned opposite the plate connector along the support structure;
the roller mount being adjacently connected to the hinge opposite the support structure;
the roller being pivotally connected to the roller mount opposite the hinge;
the pad assembly being pivotally attached to the hinge;
the hinge comprises a hinge plate;
the support structure being pivotally connected to the hinge plate; and
the roller mount being adjacently connected to the hinge plate opposite the support structure.

2. The aligning fixture for box welding as claimed in claim 1, wherein
the support structure comprises a first leg and a second leg;
the first leg being positioned adjacent to the second leg;
the first leg and the second leg being parallel with each other; and
the first leg and the second leg being pivotally connected to the plate connector and the hinge.

3. The aligning fixture for box welding as claimed in claim 1, wherein
the hinge further comprises a barrel;
the barrel being adjacently connected to the hinge plate;
the barrel being positioned along the hinge plate; and
the pad assembly being pivotally attached to the barrel.

4. The aligning fixture for box welding as claimed in claim 1, wherein
the pad assembly comprises a plate, a first flange, and a second flange;
the plate being adjacently attached to the first flange and the second flange;
the first flange and the second flange being positioned opposite each other along the plate; and
the first flange and the second flange being pivotally attached to the hinge.

5. The aligning fixture for box welding as claimed in claim 4, wherein
the hinge comprises a barrel; and
the first flange and the second flange being pivotally attached to the barrel.

6. The aligning fixture for box welding as claimed in claim 1, wherein
each of the plurality of supporting legs further comprises a tension spring; and
the tension spring being adjacently connected to the pad assembly and the hinge.

7. The aligning fixture for box welding as claimed in claim 6, wherein
the pad assembly comprises a first flange; and
the tension spring being adjacently connected to the first flange and the hinge plate.

8. The aligning fixture for box welding as claimed in claim 1, wherein the plurality of supporting legs is specifically four supporting legs.

9. The aligning fixture for box welding as claimed in claim 1, wherein
each of the plurality of supporting legs further comprises a cam acting lock mechanism;
the cam acting lock mechanism being adjacently connected to the support structure; and
the cam acting lock mechanism being positioned adjacent to the roller mount.

10. The aligning fixture for box welding as claimed in claim 9, wherein
the cam acting lock mechanism comprises a base, a shaft, and a cam;
the shaft being adjacently connected to the support structure;
the base being adjacently attached to the shaft opposite the support structure; and
the cam being adjacently connected to the base.

11. The aligning fixture for box welding as claimed in claim 10, wherein
the cam selectively engaging the roller mount.

12. The aligning fixture for box welding as claimed in claim 10, wherein
the cam selectively engaging the hinge.

13. The aligning fixture for box welding as claimed in claim 1, wherein the pad assembly is modified to provide liquid cooling.

14. The aligning fixture for box welding as claimed in claim 1, wherein the pad assembly is modified to provide inert gas purging.

15. An aligning fixture for box welding comprises:
a mounting plate;
a plurality of supporting legs;
each of the plurality of supporting legs comprises a support structure, a plate connector, a hinge, a roller mount, a roller, a pad assembly, and a tension spring;
the support structure comprises a first leg and a second leg;
the hinge comprises a hinge plate and a barrel;
the pad assembly comprises a plate, a first flange, and a second flange;
the plate connector being adjacently attached to the mounting plate;
the first leg being positioned adjacent to the second leg;
the first leg and the second leg being parallel with each other;

the first leg and the second leg being pivotally connected to the plate connector opposite the mounting plate;

the hinge being positioned opposite the plate connector along the support structure;

the first leg and the second leg being pivotally connected to the hinge plate;

the roller mount being adjacently connected to the hinge plate opposite the support structure;

the roller being pivotally connected to the roller mount opposite the hinge;

the barrel being adjacently connected to the hinge plate;

the barrel being positioned along the hinge plate;

the plate being adjacently attached to the first flange and the second flange;

the first flange and the second flange being positioned opposite each other along the pad assembly;

the first flange and the second flange being pivotally attached to the barrel; and the tension spring being adjacently connected to the first flange and the hinge plate.

16. The aligning fixture for box welding as claimed in claim 15, wherein each of the plurality of supporting legs further comprises a cam acting lock mechanism;

the cam acting lock mechanism comprises a base, a shaft, and a cam;

the cam acting lock mechanism being positioned adjacent to the roller mount;

the shaft being adjacently connected to the support structure;

the base being adjacently attached to the shaft opposite the support structure; and the cam being adjacently connected to the base.

17. The aligning fixture for box welding as claimed in claim 16, wherein the cam selectively engaging the roller mount.

18. The aligning fixture for box welding as claimed in claim 16, wherein the cam selectively engaging the hinge.

19. The aligning fixture for box welding as claimed in claim 15, wherein the pad assembly is modified to provide liquid cooling or inert gas purging.

* * * * *